Sept. 7, 1948.     H. F. STORM     2,448,690
APPARATUS FOR BONDING WEAR-RESISTANT
FACING ELEMENTS TO MACHINE ELEMENTS
Filed June 7, 1944
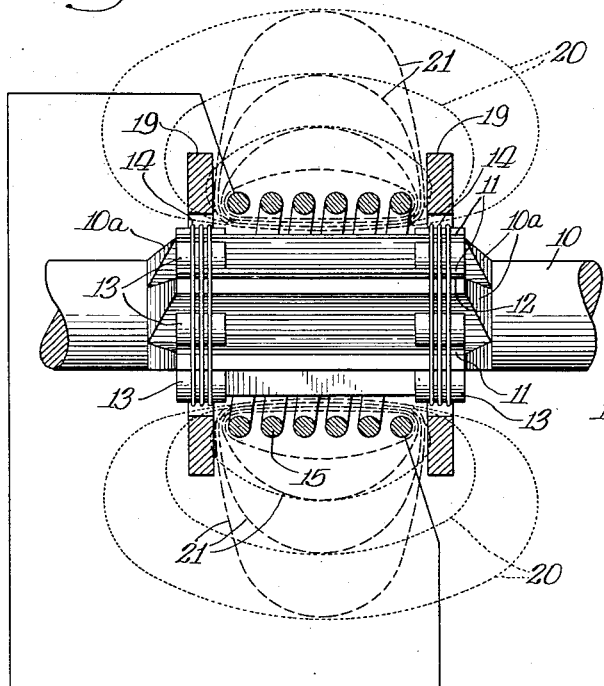
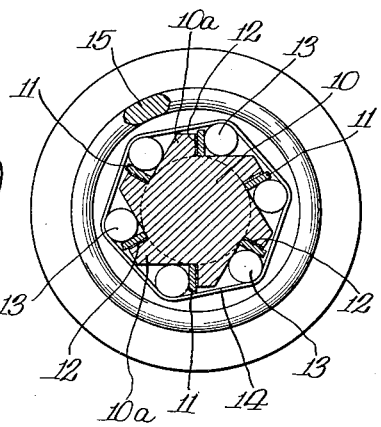
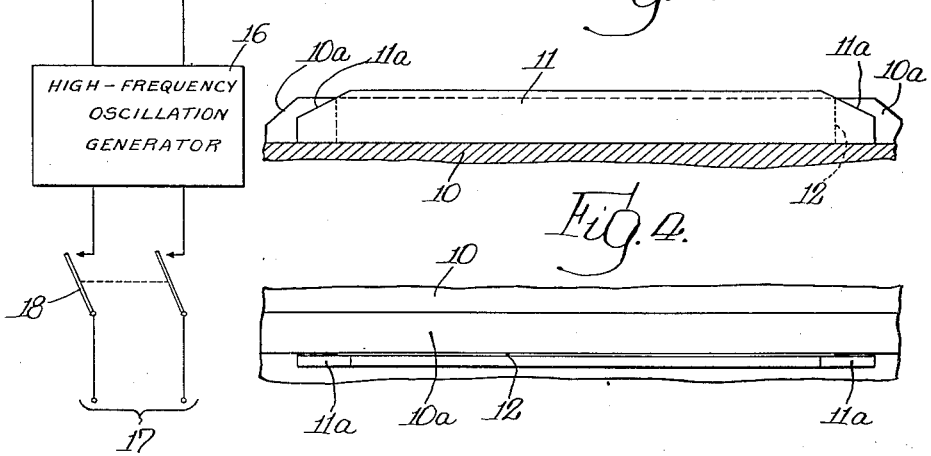
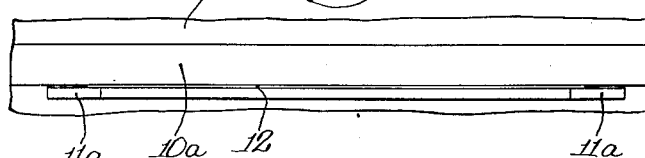
INVENTOR.
Herbert F. Storm,
BY McKenna & Morsbach
Atty's.

Patented Sept. 7, 1948

2,448,690

UNITED STATES PATENT OFFICE 2,448,690

APPARATUS FOR BONDING WEAR-RESIST-
ANT FACING ELEMENTS TO MACHINE
ELEMENTS

Herbert F. Storm, West Allis, Wis., assignor to
Sunbeam Corporation, a corporation of Illinois Application June 7, 1944, Serial No. 539,107

2 Claims. (Cl. 219—12)

This invention relates to apparatus for bonding wear-resistant facing elements to machine elements and, while it is of general application, it is particularly suitable for bonding or brazing refractory cutting elements to the cutting teeth of a rotary tool-bit cutter or miller by the high frequency induction heating method.

It is well known that there are numerous advantages to be gained from the use of a high-frequency induction heating system in the heat treatment of machine-tool elements and stock by virtue of the fact that the heat-treating cycle can be readily adjusted and accurately controlled and can be conducted in any desired atmosphere. Such high-frequency induction heating systems are particularly useful when it is desired that the heat treatment not penetrate too deeply into the object being treated, which tends to impair the toughness and resilience of the internal structure of the object. However, it has been found that arrangements heretofore proposed for bonding or brazing wear-resistant facing elements to machine elements have not been adapted for heat treatment by high-frequency induction heating systems, as the resilient devices utilized to hold in place the facing elements have been subject to excessive heating, whereby they have lost their resilience, in extreme cases even melting, so that the facing elements are not properly retained in position during the bonding or brazing operation.

It is another object of the invention to provide a new and improved apparatus for bonding wear-resistant facing elements to machine elements including high-frequency induction heating apparatus for conducting the heat treatment.

In accordance with the invention, in a machine element comprising an approximately cylindrical shank and one or more working parts arranged about the periphery thereof, the method of bonding wear-resistant metallic facing elements to the working parts while biased into engagement with such parts by means of one or more tensioned conductive metallic strands comprises positioning the facing elements adjacent the working parts with a bonding material interposed therebetween and tensioning the strands about the shank and the facing elements to bias the facing elements into engagement with the working parts. Thereupon there is developed a high-frequency magnetic field and the element is disposed therein while the tensioned strands are substantially shielded from the high-frequency field to prevent excessive heating thereof.

Further in accordance with the invention, in a machine element comprising an elongated approximately cylindrical shank and one or more elongated working parts arranged about the periphery thereof, there is provided an arrangement for bonding wear-resistant metallic elements to the working parts comprising one or more tensioned conductive metallic strands surrounding the shank and the facing elements for biasing the facing elements into engagement with the working parts with bonding material interposed therebetween. There is also provided means for developing a high-frequency magnetic field surrounding the element and means for substantially shielding the conductive strands from the high-frequency field to prevent excessive heating thereof.

The invention, both as to its organization and method of operation, together with further objects and advantages thereof, will best be understood by reference to the specification taken in connection with the accompanying drawings, in which:

Figs. 1 and 2 are partial longitudinal and cross-sectional views, respectively, of a machine element of the type described with the associated high-frequency induction heating apparatus positioned with respect thereto; and Figs. 3 and 4 are fragmentary side and top views of a single wear-resistant facing element in association with a working part of the shank of the machine element of the apparatus of Figs. 1 and 2.

Referring now to Figs. 1 and 2 of the drawings, there is illustrated partially schematically, an arrangement for bonding wear-resistant metallic elements to the working parts of a machine element or tool, specifically an arrangement for brazing refractory cutting elements to the cutting teeth of a tool-bit cutter or miller. The machine element or miller comprises an elongated approximately cylindrical shank 10 and a plurality of elongated working parts, such as the cutting teeth 10a, arranged about the periphery thereof. The wear-resistant facing or cutting elements 11 are adapted to be bonded or brazed to the cutting teeth by interposing bonding material therebetween, such as a series of shims 12 of suitable brazing material, such as silver.

In order to bias the facing or cutting elements 11 into engagement with the cutting teeth 10a during the brazing process with the bonding shims 12 retained therebetween, there are provided a plurality of relatively short rollers 13 at each end of the cutting element and shank assembly, each of the rollers being disposed in the recess between adjacent teeth and abutting against an associated facing or cutting element 11. The whole assembly is then firmly held together by one or more groups of tensioned conductive metallic strands such as the tensioned steel or "Nichrome" wire 14 wound around the groups of rollers 13 at each end of the assembly and surrounding the shank 10 and facing or cutting elements 11. The wires 14, after being drawn taut, may be secured in any suitable manner, as by twisting together the two ends of each.

The assembly as just described is suitable for treatment in an ordinary brazing furnace, but if it is attempted to treat it in a conventional high-frequency induction furnace, it has been discovered that the resistance of the tensioned wires 14 is sufficiently high and their thermal inertia so small that they become excessively heated, losing their resilience or even melting, before the brazing operation is completed. In order to avoid this result there is provided a special form of high-frequency induction heating apparatus comprising means for developing a high-frequency magnetic field surrounding the shank 10 and the facing or cutting elements 11. This may take the form of a high-frequency inductor 15 proportioned closely to surround the assembly and of a length substantially equal to the distance between the conductive strands or wires 14. The inductor 15 is adapted to be connected to a high-frequency oscillation generator 16 which is energized from supply terminals 17 through a suitable switch or circuit breaker 18. Preferably, the high-frequency oscillation generator 16 is of the improved character disclosed and claimed in copending application Serial No. 539,106, filed June 7, 1944, Herbert F. Storm, and assigned to the same assignee as the present invention.

The high-frequency induction heating apparatus also includes means for substantially shielding the conductive strands or wires 14 from the high-frequency field to prevent excessive heating thereof. This shielding means comprises a pair of annular members 19 of high conductivity material, such as copper, surrounding the strands 14 and disposed one at each end of the inductor 15. The members 19 are of a radius effective substantially to confine and concentrate the magnetic field to the portion of the facing or cutting elements 11 between the conductive strands.

In order to prevent the facing or cutting elements 11, which are quite brittle, from breaking away from their associated teeth 10a at the portion where the brazing is incomplete due to the restriction of the high-frequency magnetic field, the ends of the facing or cutting elements 11 may be beveled off at 11a, as indicated in Figs. 3 and 4, so that the actual working portion of the elements 11 is confined to the portion of their length where they are firmly bonded or brazed to the shank 10.

From the foregoing description of the apparatus for practicing the invention, the method of the invention will be clear to those skilled in the art. The elongated wear-resistant metallic facing elements 11 are bonded to the working parts or cutting teeth 10a of the shank 10 while they are biased into engagement with such teeth by means of the tensioned conductive metallic strands or wire 14 at each end of the elements 11. This is effected by initially positioning the elements 11 adjacent their associated working parts or teeth 10a with a bonding material such as the silver shims 12 interposed therebetween, a suitable fluxing material being applied to the assembly. The strands or wires 14 are then tensioned or drawn tight about the shank 10 and the associated rollers 13 and elements 11, the tensioning of the wires 14 cooperating with the rollers 13 to bias the elements 11 into engagement with their respective teeth 10a.

The high-frequency oscillation generator 16 is energized from the supply terminals 17 and operates in a conventional manner to develop a high-frequency current which is applied to the inductor 15 for developing a high-frequency magnetic field. The shank 10 and the assembled elements are then inserted within the inductor 15 and thus within its magnetic field. Neglecting for the moment the action of the annular members 19, the field developed by the inductor 15 has a general toroidal form, the cross section of which is represented by the dotted-line field 20. It is seen that this field has a substantial coupling or linkage with the tensioned strands or wires 14. These wires form a closed circuit and are of a relatively high resistance and low thermal inertia. As a result they tend to become excessively heated by the high-frequency magnetic field to the point where they lose their resilence and thus fail to hold the elements in their proper biased engagement, in some cases the wires 14 even being melted by this intense field.

In accordance with the invention, the system includes provisions for substantially shielding the tensioned strands or wires 14 from the high-frequency field to prevent such excessive heating. This effect is the result of the annular shielding members 19, which are effective to reflect the high-frequency field from the portion of the assembly including the tensioned strands 14 and to confine it to, and concentrate it on, the intervening portions of the facing or cutting elements 11, thus accentuating and accelerating the heating and brazing of these elements to the teeth 10a of the shank 10. A cross-section of the general field distribution of the high-frequency magnetic field with the shielding members 19 in place is represented by the dashed line field 21.

Thus there is provided by the invention described a practical arrangement for bonding or brazing refractory cutting elements to the cutting teeth of a rotary tool-bit cutter or miller by the use of a high-frequency induction type of heating apparatus for effecting the brazing operation.

While there has been described what is at present considered to be the preferred embodiment of the invention, it will be apparent to those skilled in the art that various changes and modifications may be made therein without departing from the spirit or scope of the invention.

What I claim as new is:

1. Apparatus for bonding a plurality of elongated cutting elements to teeth arranged about and radiating from the shank of a rotary tool bit cutter, comprising holding elements disposed against said cutting elements in the tooth slots separating said teeth to hold said cutting elements against the sides of said teeth and projecting radially beyond said cutting elements, one or more tensioned conductive metallic strands surrounding said shank and tightly wrapped around the projecting parts of said holding elements to force said holding elements into said tooth slots, thereby to bias each of said cutting elements against the sides of each of said teeth respectively, means for developing a high frequency magnetic field surrounding said cutter comprising a high frequency inductor surrounding said cutter and of a length substantially equal to the distance between said conductive strands, and means for substantially shielding the conductive strands from said high frequency field to prevent excessive heating thereof.

2. Apparatus for bonding a plurality of elongated cutting elements having end portions which are inactive in use to teeth arranged about and radiating from the shank of a rotary tool bit cutter, comprising holding elements disposed in engagement with said cutting elements at each end of the slots separating said teeth to hold said cutting elements against the sides of said teeth, said holding elements extending radially beyond the outer cutting edges of said cutting elements, one or more tensioned conductive metallic strands surrounding said shank at the inactive ends of said cutting elements and tightly wrapped around the projecting parts of said holding elements to force said holding elements into said tooth slots, thereby to bias said cutting elements against the sides of said teeth, a high frequency inductor proportioned to surround said shank and of a length substantially equal to the distance between said conductive strands, and an annular ring of high electrical conductivity disposed at each end of said inductor to surround said strands to shield the same and prevent excessive heating thereof.

HERBERT F. STORM.

REFERENCES CITED

The following references are of record in the file of this patent:

UNITED STATES PATENTS

| Number | Name | Date |
| --- | --- | --- |
| 1,453,358 | Kettering | May 1, 1923 |
| 2,059,300 | Adams | Nov. 3, 1936 |
| 2,125,316 | Ronci | Aug. 2, 1938 |
| 2,133,492 | Vatter | Oct. 18, 1938 |

OTHER REFERENCES

Babat, "Construction of Heating Coils for Induction Surface Hardening," Heat Treating and Forging, April, 1941, page 192.